(12) United States Patent
Lee et al.

(10) Patent No.: US 8,385,868 B2
(45) Date of Patent: Feb. 26, 2013

(54) DIVERSITY ANTENNA SYSTEM AND METHOD UTILIZING A THRESHOLD VALUE

(75) Inventors: Ming Lee, Ypsilanti, MI (US); Wladimiro Villarroel, Ypsilanti, MI (US); Kwan-ho Lee, Ann Arbor, MI (US); Yasutaka Horiki, Ypsilanti, MI (US)

(73) Assignee: AGC Automotive Americas R&D, Inc., Ypsilanti, MI (US)

( * ) Notice: Subject to any disclaimer, the term of this patent is extended or adjusted under 35 U.S.C. 154(b) by 217 days.

(21) Appl. No.: 12/815,848

(22) Filed: Jun. 15, 2010

(65) Prior Publication Data

US 2010/0317306 A1 Dec. 16, 2010

Related U.S. Application Data

(60) Provisional application No. 61/268,662, filed on Jun. 15, 2009, provisional application No. 61/268,689, filed on Jun. 15, 2009, provisional application No. 61/268,674, filed on Jun. 15, 2009, provisional application No. 61/268,665, filed on Jun. 15, 2009, provisional application No. 61/268,673, filed on Jun. 15, 2009, provisional application No. 61/268,663, filed on Jun. 15, 2009.

(51) Int. Cl.
*H04B 1/16* (2006.01)
(52) U.S. Cl. ............ 455/205; 455/276.1; 455/136; 455/137; 455/138; 375/347
(58) Field of Classification Search ............ 455/205, 455/276.1, 136, 137, 138; 375/347
See application file for complete search history.

(56) References Cited

U.S. PATENT DOCUMENTS

| | | | |
|---|---|---|---|
| 3,177,489 A | 4/1965 | Saltzberg |
| 3,359,555 A | 12/1967 | Taylor |
| 3,603,886 A | 9/1971 | Norrs |
| 3,670,335 A | 6/1972 | Hirsch |
| 3,870,996 A | 3/1975 | Miller |
| 3,964,065 A | 6/1976 | Roberts et al. |
| 4,051,474 A | 9/1977 | Mack et al. |
| 4,057,803 A | 11/1977 | Coleman |
| 4,085,368 A | 4/1978 | Yeh |

(Continued)

FOREIGN PATENT DOCUMENTS

| EP | 1032073 A2 | 8/2000 |
|---|---|---|
| EP | 1091447 A1 | 4/2001 |

(Continued)

OTHER PUBLICATIONS

International Search Report for Application No. PCT/US2010/038669 dated Oct. 26, 2010, 4 pages.

(Continued)

*Primary Examiner* — Sanh Phu
(74) *Attorney, Agent, or Firm* — Howard & Howard Attorneys PLLC

(57) ABSTRACT

An antenna system for receiving an RF signal from a first antenna and a second antenna includes a phase shift circuit. The phase shift circuit shifts a phase of the RF signal from the second antenna by one of a plurality of possible phase shifts to produce a phase shifted signal. A combiner combines the RF signal from the first antenna and the phase shifted signal to produce a combined signal. A comparator circuit compares a signal quality of the combined signal with a minimum threshold value to determine if the signal quality of the combined signal is equal to or greater than the threshold value. The comparator circuit is in communicative control of the phase shift circuit and maintains the phase shift of the RF signal received by the second antenna in response to the signal quality of the combined signal being equal to or greater than the threshold value.

20 Claims, 2 Drawing Sheets

U.S. PATENT DOCUMENTS

| | | | |
|---|---|---|---|
| 4,103,304 A | 7/1978 | Burnham et al. |
| 4,189,733 A | 2/1980 | Malm |
| 4,220,954 A | 9/1980 | Marchand |
| 4,225,870 A | 9/1980 | Marner et al. |
| 4,280,128 A | 7/1981 | Masak |
| 4,298,873 A | 11/1981 | Roberts |
| 4,308,541 A | 12/1981 | Seidel et al. |
| 4,313,116 A | 1/1982 | Powell et al. |
| 4,408,205 A | 10/1983 | Hockham |
| 4,584,581 A | 4/1986 | Teshirogi |
| 4,704,724 A | 11/1987 | Krishnan et al. |
| 4,803,492 A | 2/1989 | Inaba et al. |
| 4,814,777 A | 3/1989 | Monser |
| 4,821,039 A | 4/1989 | Crane |
| 4,849,992 A | 7/1989 | Alderman et al. |
| 5,068,668 A | 11/1991 | Tsuda et al. |
| 5,107,273 A | 4/1992 | Roberts |
| 5,117,236 A | 5/1992 | Chang et al. |
| 5,317,288 A | 5/1994 | Yung et al. |
| 5,377,035 A | 12/1994 | Wang et al. |
| 5,515,059 A | 5/1996 | How et al. |
| 5,517,686 A | 5/1996 | Kennedy et al. |
| 5,568,158 A | 10/1996 | Gould |
| 5,600,333 A | 2/1997 | Justice et al. |
| 5,603,107 A | 2/1997 | Gottfried et al. |
| 5,710,995 A | 1/1998 | Akaiwa et al. |
| 5,760,740 A | 6/1998 | Blodgett |
| 5,818,385 A | 10/1998 | Bartholomew |
| 5,898,405 A | 4/1999 | Iwasaki |
| 5,909,191 A | 6/1999 | Hirshfield et al. |
| 5,999,138 A | 12/1999 | Ponce de Leon |
| 6,002,672 A | 12/1999 | Todd |
| 6,018,315 A | 1/2000 | Ince et al. |
| 6,064,865 A * | 5/2000 | Kuo et al. .................... 455/135 |
| 6,087,986 A | 7/2000 | Shoki et al. |
| 6,121,925 A | 9/2000 | Hilliard |
| 6,125,109 A | 9/2000 | Fuerter |
| 6,144,339 A | 11/2000 | Matsumoto et al. |
| 6,172,970 B1 | 1/2001 | Ling et al. |
| 6,175,723 B1 | 1/2001 | Rothwell, III |
| 6,229,840 B1 | 5/2001 | Ichihara |
| 6,236,839 B1 | 5/2001 | Gu et al. |
| 6,271,798 B1 | 8/2001 | Endo et al. |
| 6,278,415 B1 | 8/2001 | Matsuyoshi et al. |
| 6,313,807 B1 | 11/2001 | Kolak |
| 6,314,127 B1 | 11/2001 | Lynch et al. |
| 6,369,756 B1 | 4/2002 | Wang et al. |
| 6,388,621 B1 | 5/2002 | Lynch |
| 6,414,624 B2 | 7/2002 | Endo et al. |
| 6,449,469 B1 * | 9/2002 | Miyahara .................... 455/273 |
| 6,456,257 B1 | 9/2002 | Zamat |
| 6,470,186 B1 | 10/2002 | Whikehart et al. |
| 6,480,526 B1 | 11/2002 | Shoki et al. |
| 6,486,828 B1 | 11/2002 | Cahn et al. |
| 6,535,168 B1 | 3/2003 | Marumoto et al. |
| 6,559,798 B1 | 5/2003 | Marumoto et al. |
| 6,563,860 B2 | 5/2003 | Schilling |
| 6,646,614 B2 | 11/2003 | Killen |
| 6,661,386 B1 | 12/2003 | Petros et al. |
| 6,731,940 B1 | 5/2004 | Nagendran |
| 6,768,457 B2 | 7/2004 | Lindenmeier |
| 6,816,116 B2 | 11/2004 | Chen |
| 6,831,611 B2 | 12/2004 | Ooe et al. |
| 6,867,739 B2 | 3/2005 | Prassmayer et al. |
| 6,885,349 B2 | 4/2005 | Hickel |
| 6,925,293 B2 | 8/2005 | Lindenmeier et al. |
| 6,952,587 B2 | 10/2005 | Whikehart et al. |
| 6,959,175 B2 * | 10/2005 | Ohtaki ........................ 455/139 |
| 6,973,138 B1 | 12/2005 | Wright |
| 6,977,611 B1 | 12/2005 | Crabb |
| 7,015,861 B2 | 3/2006 | Boyd et al. |
| 7,016,399 B1 | 3/2006 | Vadgama et al. |
| 7,075,485 B2 | 7/2006 | Song et al. |
| 7,088,104 B2 | 8/2006 | Bottomley |
| 7,099,415 B2 | 8/2006 | Ohsawa |
| 7,099,644 B2 | 8/2006 | Whikehart et al. |
| 7,113,748 B2 | 9/2006 | Shapira et al. |
| 7,119,751 B2 | 10/2006 | Li et al. |
| 7,126,553 B1 | 10/2006 | Fink et al. |
| 7,149,480 B2 | 12/2006 | Miyahara |
| 7,170,465 B2 | 1/2007 | Rofougaran |
| 7,200,368 B1 | 4/2007 | Hottinen et al. |
| 7,209,096 B2 | 4/2007 | Chau |
| 7,224,391 B2 | 5/2007 | Kimura et al. |
| 7,256,649 B2 | 8/2007 | Ksienski et al. |
| 7,345,626 B2 | 3/2008 | Smith et al. |
| 7,366,139 B2 | 4/2008 | Poegel et al. |
| 7,369,832 B2 * | 5/2008 | Cho ........................ 455/276.1 |
| 7,498,993 B1 | 3/2009 | Lee et al. |
| 7,522,899 B1 | 4/2009 | He |
| 7,545,333 B2 | 6/2009 | Li et al. |
| 7,564,407 B2 | 7/2009 | Yoshizoe et al. |
| 7,596,168 B2 | 9/2009 | Saito |
| 7,919,997 B2 * | 4/2011 | Obkircher ................ 327/119 |
| 8,086,203 B2 * | 12/2011 | Gonikberg .............. 455/277.1 |
| 2004/0130496 A1 | 7/2004 | Iijima et al. |
| 2004/0190658 A1 * | 9/2004 | Ohtaki et al. ............ 375/347 |
| 2004/0229588 A1 * | 11/2004 | Cho ........................ 455/278.1 |
| 2005/0117545 A1 | 6/2005 | Wittwer et al. |
| 2006/0172710 A1 | 8/2006 | Cahana et al. |
| 2008/0119148 A1 | 5/2008 | Ray |
| 2008/0129616 A1 | 6/2008 | Li et al. |
| 2009/0116586 A1 | 5/2009 | Arambepola et al. |
| 2010/0317309 A1 | 12/2010 | Lee et al. |
| 2012/0108178 A1 | 5/2012 | Lee et al. |

FOREIGN PATENT DOCUMENTS

EP   1480367 A2   11/2004

OTHER PUBLICATIONS

Chun-Ning Zhang et al., "A Low-Complexity Antenna Diversity Receiver Suitable for TDMA Handset Implementation", 1997, IEEE, pp. 1753-1757.

International Search Report for Application No. PCT/US2010/038673 dated Oct. 25, 2010, 4 pages.

International Search Report for Application No. PCT/US2010/038685 dated Oct. 28, 2010, 4 pages.

* cited by examiner

DIVERSITY ANTENNA SYSTEM AND METHOD UTILIZING A THRESHOLD VALUE

CROSS REFERENCE TO RELATED APPLICATION

This application claims the benefit of U.S. provisional patent application Nos. 61/268,662, 61/268,663, 61/268,665, 61/268,673, 61/268,674, and 61/268,689, each filed on Jun. 15, 2009 and each of which is hereby incorporated by reference.

BACKGROUND OF THE INVENTION

1. Field of the Invention

The application generally relates to a system and method for providing a combined antenna signal to a receiver.

2. Description of the Related Art

The use of radio frequency (RF) receivers in vehicles, such as automobiles, is commonplace. In fact, many vehicles involve multiple RF receivers for different applications. These applications include, but are not limited to, terrestrial AM radio broadcasts, terrestrial FM radio broadcasts, satellite radio broadcast (e.g., SDARS), global positioning system (GPS) reception, and cellular telephone reception.

Typically, vehicles are equipped with a single antenna for each application that is to be received and often, a single antenna is utilized for multiple applications. However, many disadvantages may occur with such a single antenna implementation. For instance, as the vehicle moves, the quality of the RF signal often changes due to several factors, including, but not limited to, the position of the antenna in relation to the vehicle itself and a source of the RF signal. Furthermore, when the antenna is disposed below the vehicle's roof, which acts as a large ground plane, the signal quality of the RF signal is often reduced and/or distorted.

As such, the subject application provides an antenna system and method to overcome these and other deficiencies of the prior art.

BRIEF SUMMARY AND ADVANTAGES

The application discloses an antenna system for receiving a radio frequency (RF) signal from a first antenna and a second antenna and providing a combined signal to a receiver. The system includes a phase shift circuit electrically connectable to the second antenna for shifting a phase of the RF signal by one of a plurality of possible phase shifts to produce a phase shifted signal. A combiner is electrically connectable to the first antenna and electrically connected to the phase shift circuit for combining the RF signal and the phase shifted signal to produce a combined signal. The system also includes a comparator circuit electrically connected to the combiner for receiving the combined signal and comparing a signal quality of the combined signal with a minimum threshold value to determine if the signal quality of the combined signal is equal to or greater than the threshold value. The comparator circuit is in communicative control of the phase shift circuit for maintaining the phase shift of the RF signal received by the second antenna in response to the signal quality of the combined signal being equal to or greater than the threshold value.

The application also discloses a method of providing a signal to a receiver using an antenna system. The method comprising the steps of receiving an RF signal with a first antenna and receiving the RF signal with a second antenna. The RF signal received by the second antenna is phase-shifted to produce a phase shifted signal. The method further comprises combining the RF signal received from the first antenna and the phase shifted signal to produce a combined signal. The signal quality of the combined signal is compared with a threshold value. The method also comprises the step of maintaining the phase shift of the RF signal received by the second antenna in response to the signal quality of the combined signal being equal to or greater than the threshold value. The combined signal is provided to the receiver.

Maintaining the phase shift applied to the second RF signal when the signal quality of the combined signal is greater than or equal to the threshold value provides several advantages to the system and method. First, the system and method do not "hunt" for better phase shifts to be applied to the second RF signal in an attempt to find an optimized combined signal, as this may often result in a prolonged period of substandard combined signals delivered to the receiver. Also, the switching of the phase shift by the phase shift circuit may introduce noise into the phase shifted and combined signals, which is also not desired. Second, the components involved in such a system and method are minimal, resulting in a much lower cost than other phase shifting diversity antenna systems.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, an antenna system 10 for receiving a radio frequency (RF) signal and providing a combined signal to a receiver 12 is shown herein. A method of providing a combined signal to the receiver 12 is also described herein. The system 10 and receiver 12 may be implemented in a vehicle 14. However, those skilled in the art appreciate that the system 10 may be utilized in other non-vehicle applications.

Figure 2:
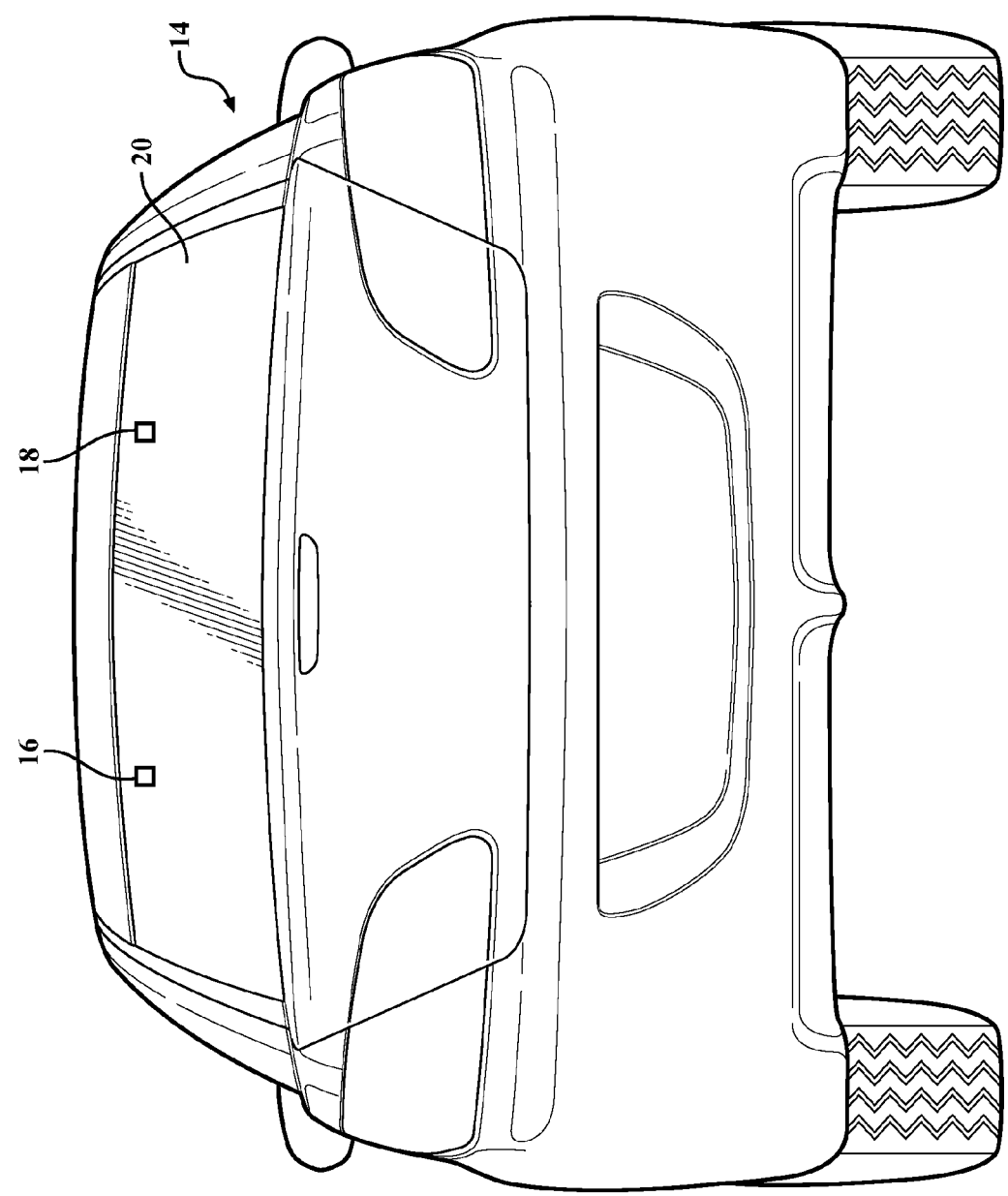
FIG. 2 is a perspective view of a vehicle having two antennas disposed on a rear window.

In the illustrated embodiments, a first antenna 16 and a second antenna 18 each receive the RF signal. That is, each antenna 16, 18 receives the RF signal at a desired frequency or range of frequencies. In the illustrated embodiment, as shown in FIG. 2, the antennas 16, 18 are patch antennas coupled to a single window 20 of the vehicle 14. As such, the antennas 16, 18 are conformal to one another and/or the vehicle 14. However, the system may utilize many different designs and/or types of the antennas 16, 18 disposed in a wide variety of locations on the vehicle 14. Furthermore, the system 10 and antennas 16, 18 may be utilized in non-vehicular applications.

Figure 1:
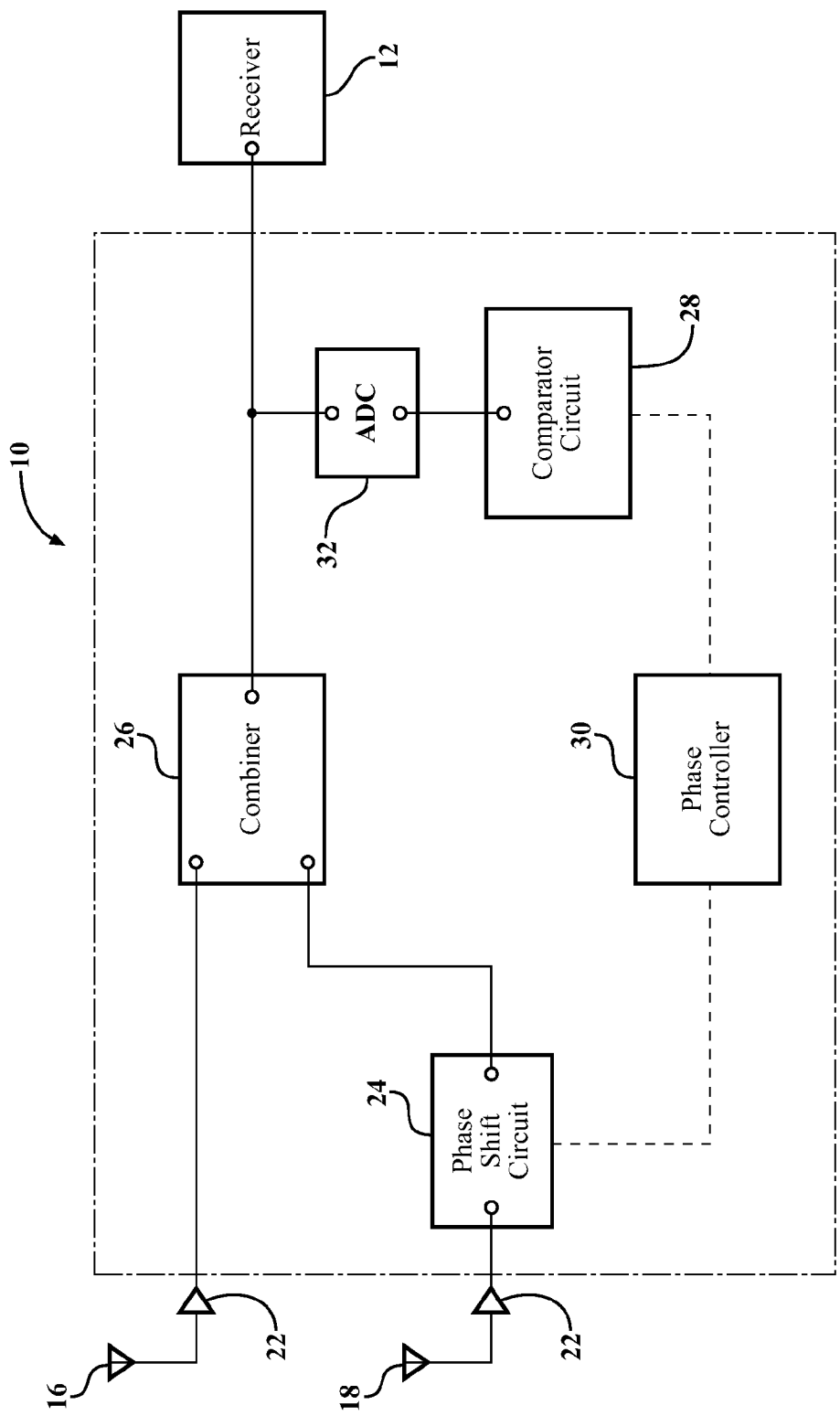
FIG. 1 is a block electrical diagram of one embodiment of an antenna system.

In the illustrated embodiments, as shown in FIG. 1, an amplifier 22 is electrically connected to each of the antennas 16, 18 for amplifying the RF signal received at each antenna 16, 18. These amplifiers 22 may be low-noise amplifiers (LNAs) as are known to those skilled in the art. The amplifiers 22 may be disposed in close proximity to the antennas 16, 18 or, alternatively, are disposed somewhat distant from the antennas 16, 18.

Still referring to FIG. 1, the system 10 includes a phase shift circuit 24 electrically connectable to the second antenna 18. In the illustrated embodiment, the phase shift circuit 24 is electrically connected to the second antenna 18. More specifically, is electrically connected to an output (not numbered) of the amplifier 22 of the second antenna 18.

The phase shift circuit 24 shifts a phase of the RF signal by one of a plurality of possible phase shifts to produce a phase shifted signal. That is, the phase shift circuit 24 variably shifts the phase of the RF signal by any of a number of phase shifts. As such, the phase shift circuit 24 may also be referred to as a "variable phase shift circuit" or a "phase shifter". In the illustrated embodiments, the amount of phase shift imposed on the RF signal is variable between 0 and 360 degrees. That is, the phase shift circuit 24 may impose no phase shift on the RF signal, thus, not changing the RF signal in any meaningful way. Or, the phase shift circuit 24 may impose any amount of phase shift on the non-phase shifted signal, based on the technical limitations of the specific phase shift circuit 24 that is implemented. For example, the phase shift circuit 24 may be capable of shifting the phase of the RF signal by 0° (no phase shift), 2.5°, 5°, 7.5°, 10°, 12.5°, and 15°. Furthermore, those skilled in the art realize that the phase shift of a signal is analogous to a time delay of the signal.

The system 10 also includes a combiner 26 electrically connectable to the first antenna 16 and electrically connected to the phase shift circuit 24. In the illustrated embodiment, the combiner is electrically connected to the first antenna 16. More specifically, the combiner 26 includes one input (not numbered) electrically connected to an output (not numbered) of the amplifier 22 of the first antenna 16 and another input (not numbered) electrically connected to an output (not numbered) of the phase shift circuit 24. The combiner 26 receives and combines the RF signal from the first antenna 16 and the phase shifted signal from the phase shift circuit 24 to produce a combined signal.

The system 10 further includes a comparator circuit 28 electrically connected to the combiner 26. The comparator circuit 28 includes circuitry to perform logic comparisons. For example, the comparator circuit 28 may be a microprocessor, a microcontroller, an application specific integrated circuit, field programmable gate array, or merely a plurality of logic gates. Those skilled in the art realize other suitable techniques to implement the comparator circuit 28 as described herein.

The comparator circuit 28 receives the combined signal and compares a signal quality of the combined signal with a minimum threshold value. The comparator circuit 28 then determines if the signal quality of the combined signal is equal to or greater than the threshold value. Signal quality refers to any of several aspects of a signal, including, but not limited to, high signal strength, low noise in the signal, and high signal-to-noise ratio. The threshold value may be predetermined and stored by the comparator circuit 28.

The comparator circuit 28 is in communicative control of the phase shift circuit 24. As such, the comparator circuit 28 and phase shift circuit 24 maintain the phase shift of the RF signal received by the second antenna 18 in response to the signal quality of the combined signal being equal to or greater than the threshold value. As such, the threshold value may be referred to as a minimum threshold value. Preferably, this threshold value is related to the minimum requirements of the receiver for successfully decoding and/or demodulating the combined signal.

It is preferred that the comparator circuit 28 changes the phase shift implemented by the phase shift circuit 24 only when the signal quality is less than the minimum threshold value. That is, the phase shift applied to the second RF signal from the second antenna 18 is not changed unless the signal quality should drop below the threshold value. As such, the system 10 does not "hunt" for better phase shifts to be applied to the second RF signal in an attempt to find an optimized combined signal, as this may often result in a prolonged period of substandard combined signals delivered to the receiver 12. Also, the switching of the phase shift by the phase shift circuit 24 may introduce noise into the phase shifted and combined signals, which is also not desired by the receiver 12.

It is further preferred that the comparator circuit 28 automatically changes the phase shift implemented by the phase shift circuit 24 when the signal quality of the combined signal is less than the minimum threshold value. Specifically, a new phase shift, different from the current phase shift, is applied to the RF signal from the second antenna 18 when the combined signal falls below the threshold level. The phase shifted signal, with the new phase shift, is then combined with the RF signal from the first antenna 16. The combined signal is evaluated by the comparator circuit 28. If the combined signal has a signal quality that is equal to or greater than the threshold value, then the process stops and the current phase shift is maintained by the phase shift circuit 24. However, if the signal quality of the combined signal is still below the threshold value, then the process repeats, applying yet another different phase shift to the RF signal from the second antenna 18.

For example, the signal quality may be a signal-to-noise ratio (SNR) and the threshold value may be 15 dB. If the SNR of the combined signal is 20 dB, then the current phase shift is maintained by the phase shift circuit 24. That is, no changes to the phase shift are made. However, if the SNR of the combined signal is 10 dB, then the comparator circuit 28 automatically adjusts the phase shift produced by the phase shift circuit 24 to a different phase shift. If the combined signal then has a SNR of 13 dB, then the comparator circuit 28 again automatically adjusts the phase shift produced by the phase shift circuit 24 to yet another phase shift. If the combined signal then has a SNR of 16 dB, then the process stops and the current phase shift produced by the phase shift circuit 24 is maintained.

The comparator circuit 28 may include a time delay function for delaying how quickly the comparator circuit 28 changes the phase shift when the signal quality of the combined signal falls below the threshold value. For instance, the comparator circuit 28 may require that the signal quality of the combined signal is less than the threshold value for at least 0.5 seconds. This would prevent unnecessary switching of the phase shift, and the resulting disturbances to the receiver 12, due to electromagnetic interference with the RF signal or other scenarios realized by those skilled in the art.

The system 10 may include a counter 30 in communication with the phase shift circuit 24 and the comparator circuit 28. The counter 30 implements one of the plurality of possible phase shifts to shift the phase of the RF signal from the second antenna 18 to produce the phase shifted signal. As such, the counter 30 servers as the control mechanism to change the phase shift produced by the phase shift circuit 24, and may also be referred to as a "phase controller".

The system 10 of the illustrated embodiment also includes an analog-to-digital converter (ADC) 32 electrically connected to the combiner 26 and the comparator circuit 28. The ADC 32 receives the combined signal from the combiner 26 and produces digital data corresponding to the combined signal, for use by the comparator circuit 28. More specifically, the ADC 32 may produce digital data corresponding to the signal strength. Of course, those skilled in the art realize that the ADC 32 may produce digital data corresponding to other factors of signal quality. Furthermore, those skilled in the art realize techniques for implementing the system 10 that do not necessarily require use of the ADC 32. The ADC 32 may be integrated as part of the comparator circuit 28 or a separate module, as readily appreciated by those skilled in the art.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An antenna system for receiving a radio frequency (RF) signal from a first antenna and a second antenna and providing a combined signal to a receiver, said system comprising:
   a phase shift circuit electrically connectable to the second antenna for shifting a phase of the RF signal by one of a plurality of possible phase shifts to produce a phase shifted signal;
   a combiner electrically connectable to the first antenna and electrically connected to said phase shift circuit for combining the RF signal and the phase shifted signal to produce a combined signal; and
   a comparator circuit electrically connected to said combiner for receiving the combined signal and comparing a signal quality of the combined signal with a minimum threshold value to determine if the signal quality of the combined signal is equal to or greater than the threshold value; and
   wherein said comparator circuit is in communicative control of said phase shift circuit for maintaining the phase shift of the RF signal received by the second antenna in response to the signal quality of the combined signal being equal to or greater than the threshold value.

2. An antenna as set forth in claim 1 wherein said comparator circuit changes the phase shift implemented by said phase shift circuit in response to the signal quality being less than the minimum threshold value.

3. An antenna as set forth in claim 1 wherein said comparator circuit changes the phase shift implemented by said phase shift circuit only in response to the signal quality being less than the minimum threshold value.

4. An antenna system as set forth in claim 1 further comprising a counter in communication with said phase shift circuit for implementing one of the plurality of possible phase shifts to shift the phase of the RF signal from the second antenna to produce the phase shifted signal.

5. An antenna system as set forth in claim 1 further comprising an analog-to-digital converter (ADC) electrically connected to said combiner for receiving the combined signal to produce digital data corresponding to a signal strength of the combined signal.

6. An antenna system as set forth in claim 5 wherein signal quality is further defined as signal strength.

7. An antenna system for receiving a radio frequency (RF) signal and providing a combined signal to a receiver, said system comprising:
   a first antenna for receiving the RF signal and a second antenna for receiving the RF signal;
   a phase shift circuit electrically connectable to said second antenna for shifting a phase of the RF signal from the second antenna by one of a plurality of possible phase shifts to produce a phase shifted signal;
   a combiner electrically connectable to the first antenna and electrically connected to said phase shift circuit for combining the first RF signal and the phase shifted signal to produce a combined signal; and
   a comparator circuit electrically connected to said combiner for receiving the combined signal and comparing a signal quality of the combined signal with a minimum threshold value to determine if the signal quality of the combined signal is equal to or greater than the threshold value; and
   wherein said comparator circuit is in communicative control of said phase shift circuit for maintaining the phase shift of the RF signal received by the second antenna in response to the signal quality of the combined signal being equal to or greater than the threshold value.

8. An antenna as set forth in claim 7 wherein said comparator circuit changes the phase shift implemented by said phase shift circuit only in response to the signal quality being less than the minimum threshold value.

9. An antenna as set forth in claim 7 wherein said comparator circuit automatically changes the phase shift implemented by said phase shift circuit in response to the signal quality being less than then minimum threshold value.

10. An antenna system as set forth in claim 7 further comprising a counter in communication with said phase shift circuit for implementing one of the plurality of possible phase shifts to shift the phase of the RF signal from the second antenna to produce the phase shifted signal.

11. An antenna system as set forth in claim 7 further comprising an analog-to-digital converter (ADC) electrically connected to said combiner for receiving the combined signal to produce digital data corresponding to a signal strength of the combined signal.

12. An antenna system as set forth in claim 11 wherein signal quality is further defined as signal strength.

13. An antenna system as set forth in claim 7 wherein each of said antennas are disposed on a window of a vehicle.

14. An antenna system as set forth in claim 13 wherein said antennas are conformal to each other and/or the vehicle.

15. A method of providing a signal to a receiver using an antenna system, said method comprising the steps of:
   receiving a radio frequency (RF) signal with a first antenna;
   receiving the RF signal with a second antenna;
   phase-shifting the RF signal received by the second antenna to produce a phase shifted signal;
   combining the RF signal received from the first antenna and the phase shifted signal to produce a combined signal;
   comparing a signal quality of the combined signal with a threshold value;
   maintaining the phase shift of the RF signal received by the second antenna in response to the signal quality of the combined signal being equal to or greater than the threshold value; and
   providing the combined signal to the receiver.

16. A method as set forth in claim 15 further comprising the step of changing the phase shift of the RF signal received by the second antenna in response to the signal quality of the combined signal being less than the threshold value to change the phase shifted signal.

17. A method as set forth in claim 15 further comprising the step of changing the phase shift implemented by said phase shift circuit only in response to the signal quality being less than the minimum threshold value.

18. A method as set forth in claim 15 wherein signal quality is further defined as signal strength.

19. A method as set forth in claim 15 wherein signal quality is further defined as an inverse of noise signal.

20. A method as set forth in claim 15 wherein signal quality is further defined as signal-to-noise ratio.

* * * * *